March 16, 1965

L. SHAPIRO 3,174,098

SPIN RESONANCE SYSTEM

Filed Aug. 10, 1961

INVENTOR.
Louis Shapiro
BY
Millman and Jacobs
ATTORNEYS.

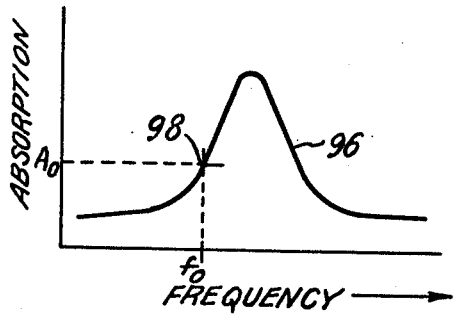
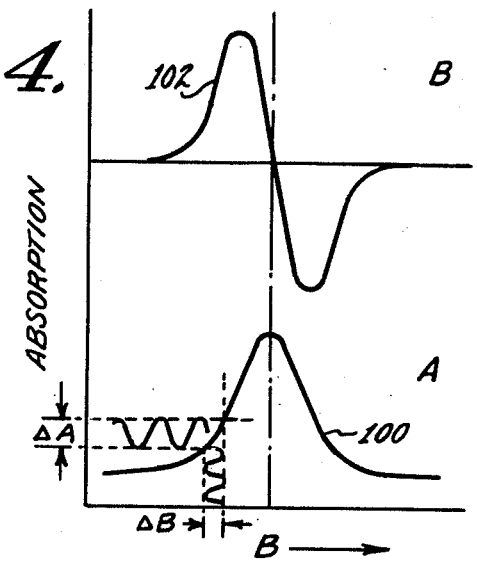
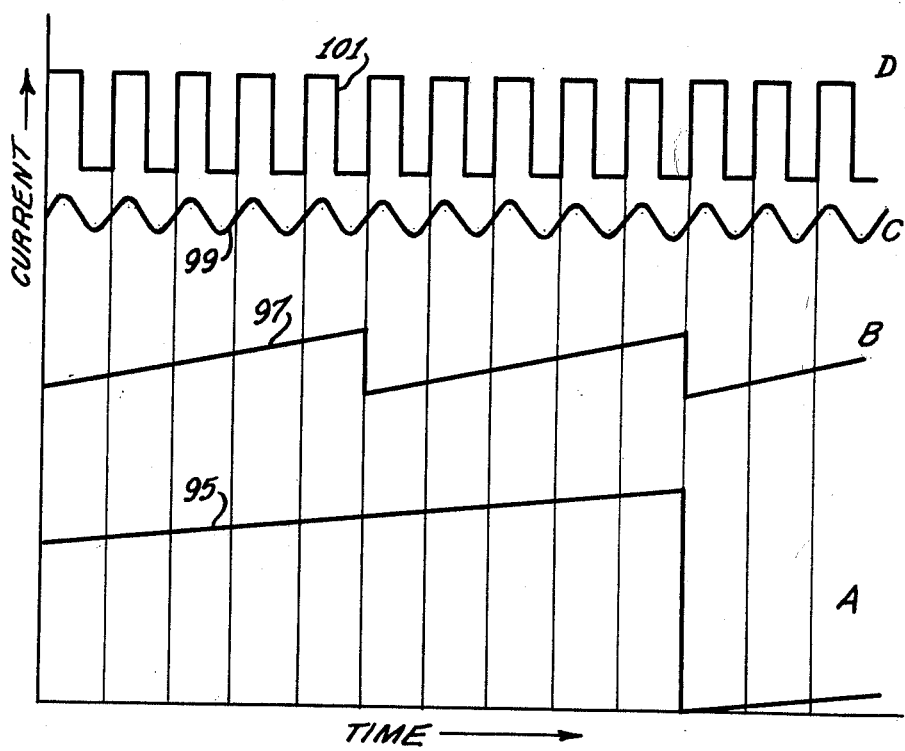
Fig. 3.
Fig. 4.
Fig. 5.
INVENTOR.
Louis Shapiro
BY
Millman and Jacobs
ATTORNEYS.

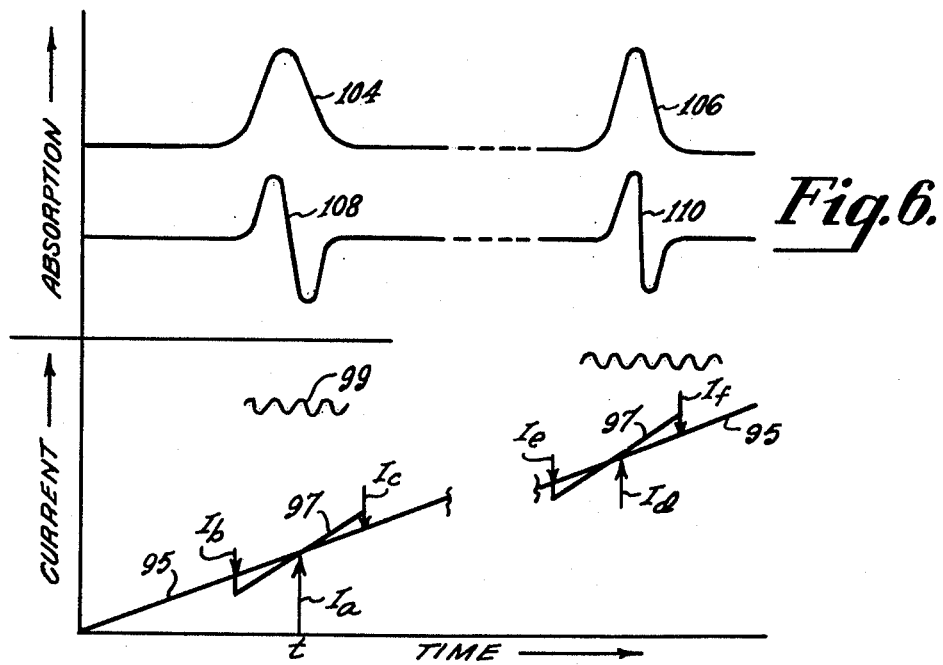
Fig.6.
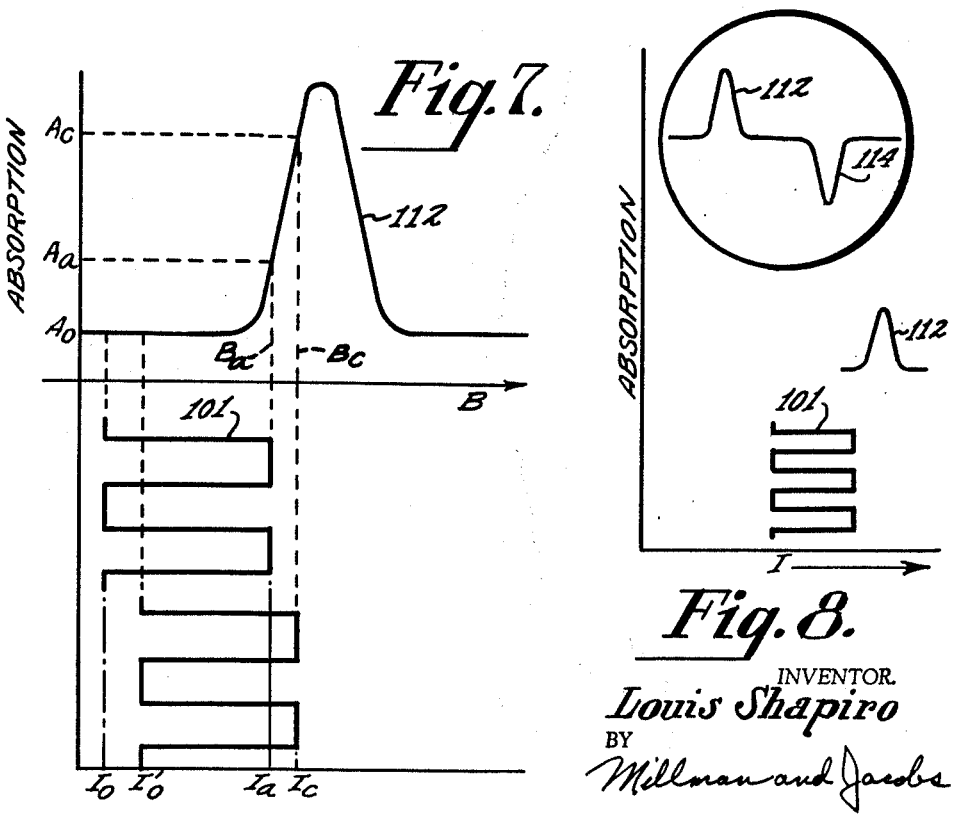
Fig.7.
Fig.8.

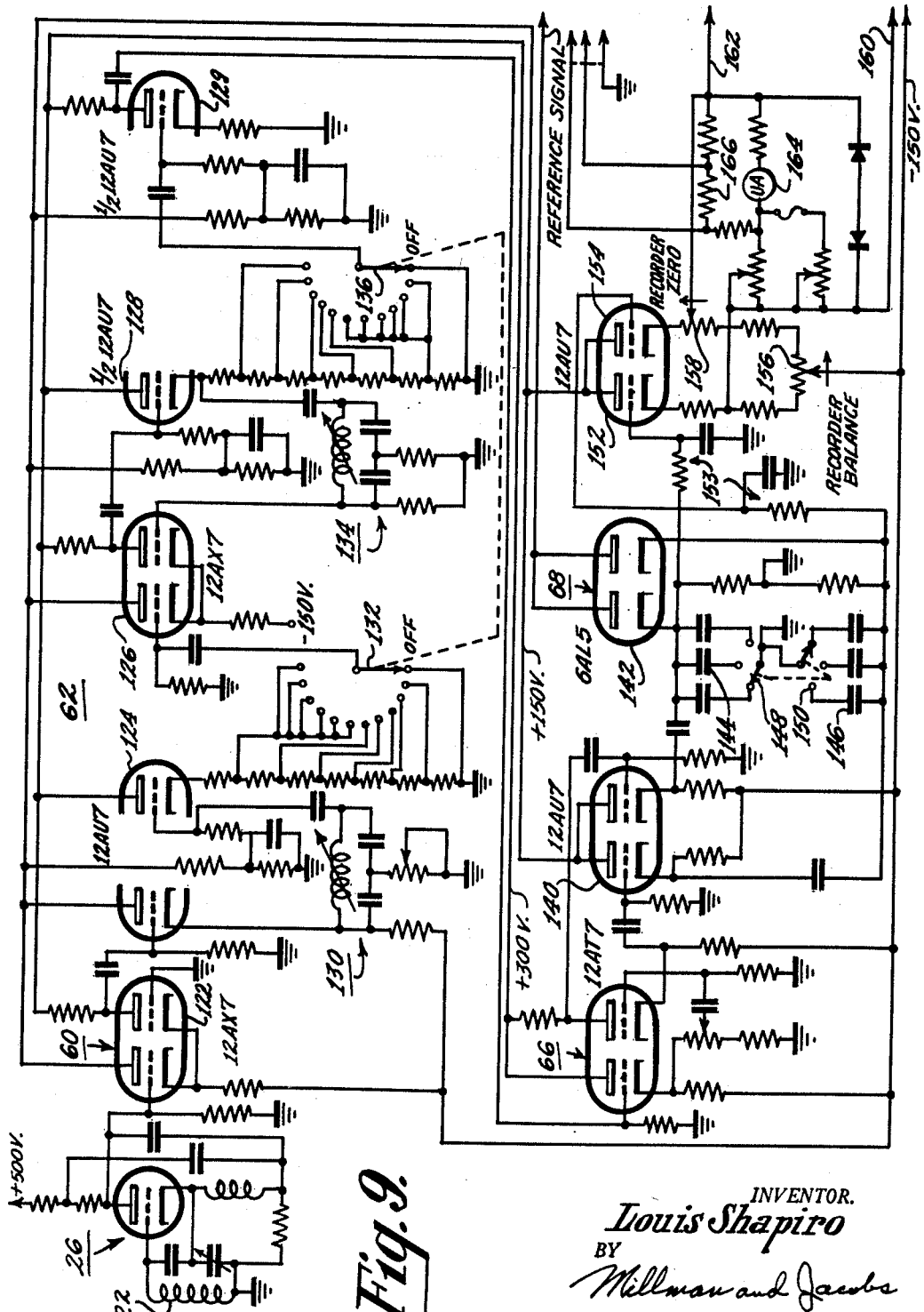

United States Patent Office 3,174,098
Patented Mar. 16, 1965

3,174,098
SPIN RESONANCE SYSTEM
Louis Shapiro, Erlton, N.J., assignor, by mesne assignments, to The First Pennsylvania Banking and Trust Company, trustee
Filed Aug. 10, 1961, Ser. No. 130,674
12 Claims. (Cl. 324—.5)

This invention relates to a system for deriving the spin resonance characteristics of a specimen.

This application is a continuation in part of my application, "Apparatus for Producing a Magnetic Field," Serial No. 59,365, filed September 29, 1960.

Spin resonance detection and measuring systems have been described in a number of articles; see, for example, the article by E. Zavoisky, "Paramagnetic Relaxation of Liquid Solutions for Perpendicular Fields," in the U.S.S.R. Journal of Physics, vol. IX, No. 3, 1945, page 211 et seq; the articles by Bloch et al., "Nuclear Induction" and "Nuclear Induction Experiment," in the Physical Review, vol. LXX, pages 460–485, October 1946; and U.S. Patent No. Re. 23,950.

It is an object of this invention to provide a new and improved spin resonance system, method, and equipment.

Another object is to provide a new and improved spin resonance equipment, method, and system whereby the spin resonance line patterns of specimens and their derivatives may be obtained.

Another object is to provide a new and improved spin resonance system and equipment whereby the characteristic line patterns of specimens and the derivative forms thereof may be displayed and recorded with high accuracy.

In accordance with an embodiment of this invention, a spin resonance system involves the application of orthogonal magnetic fields to specimens, and the varying of the field over a certain range that extends substantially on each side of the value characteristic of spin resonance for a specimen, and at the same time further varying that field with substantially rectangular pulsations.

Also, in accordance with an embodiment of this invention, a spin resonance system includes an arrangement for supplying a combined energization to the specimen which selectively includes a slowly varying energization, a fast varying energization periodically recurring at a low frequency, and another energization periodically recurring at a high frequency and that is alternatively in the form of rectangular wave pulses or sine waves.

The foregoing and other objects of this invention, the features thereof, as well as the invention itself, may be more fully understood from the following description when read together with the accompanying drawing, in which:

FIG. 3 is an idealized graph of a line pattern of the spin resonance characteristic of a specimen;

FIG. 4 is an idealized graph of a characteristic spin resonance line pattern and the derivative of that line pattern;

FIG. 5 is an idealized graph of individual scanning waveforms utilized in the system of FIG. 1;

FIG. 6 is an idealized graph of the combination of different waveforms to produce various line patterns;

FIG. 7 is an idealized graph of the use of rectangular pulses to derive the characteristic line pattern of a specimen;

FIG. 8 is an idealized graph of the waveforms produced in deriving the characteristic line pattern of a specimen; and FIG. 9 is a schematic circuit diagram of portions of the system of FIG. 1.

In the drawing, corresponding parts are referenced by the same numerals.

Figures 1, 2:
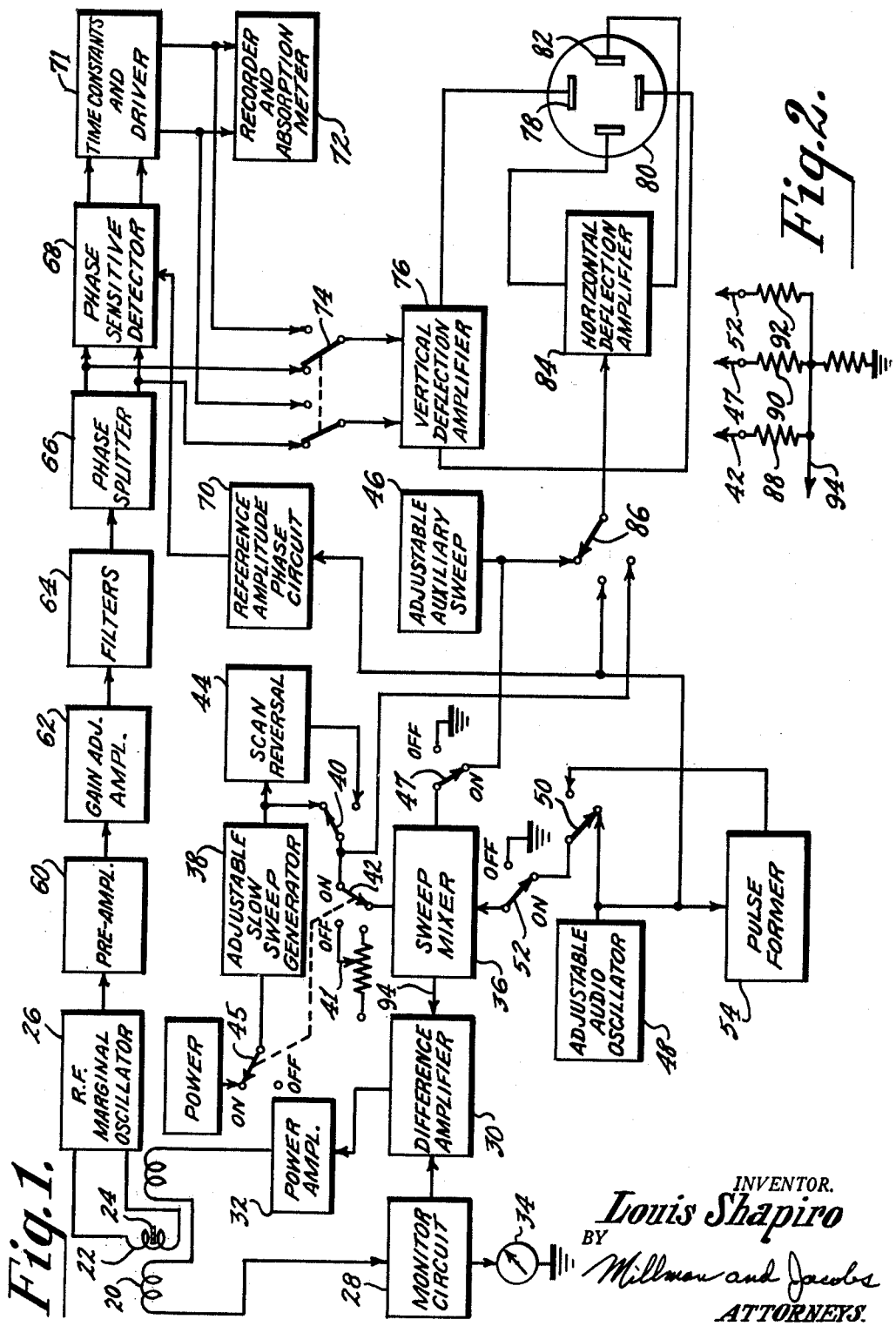
FIG. 1 is a schematic block diagram of a spin resonance system embodying this invention.
FIG. 2 is a schematic circuit diagram of a portion of the system of FIG. 1.

In FIG. 1, a pair of orthogonally oriented coils 20 and 22 are arranged to receive a specimen 24 within their turns so that the magnetic fields developed by currents in the coils 20 and 22 are applied to the specimen 24. Radio frequency oscillations are supplied to the coil 22 from a marginal oscillator 26. The coil 20 is energized through a feedback loop (described in detail in the aforementioned copending application) that includes a monitor circuit 28, such as a series resistance, and a difference amplifier 30 which drives the coil 23 via a power amplifier 32. A meter 34 provides an indication of the energizing current in the coil 20 via the monitor circuit 28.

The second input to the difference amplifier 30 is from a mixer circuit 36 that has three inputs. A slow sweep generator 38 is connected via a switch 40 and an on-off switch 42 to one input of the sweep mixer 36. In the "off" position, switch 42 is connected to a potentiometer for supplying a direct voltage to the mixer 36. The slow sweep generator 38 supplies a sawtooth waveform 95 (FIG. 5) at an extremely slow rate which may be adjusted over a range from minutes to one-half hour or one hour or more. The amplitude range of the waveform is adjustable, and its D.C. level is also adjustable. The slow scan rates permit the scanning of a complete line configuration of average to narrow width in about twenty minutes, and are useful for scanning a fine line structure of several narrow lines. A suitable circuit for providing an extremely linear sawtooth at such slow rates is described in my copending application, "Electron Probe System," Serial No. 92,889, filed March 2, 1961. The circuit described there also has the other adjustments needed in this system. The generator 38 normally supplies a waveform that varies from a high voltage to a low voltage; for reversal of the direction of this sawtooth, an inverter 44 is effective via the switch 40 placed in the opposite position. Power is supplied to the generator 38 via the on-off switch 44 which is ganged to the switch 42. When the latter 42 is connected to the potentiometer 41, the power to the slow sweep generator 38 is off.

An auxiliary sweep generator 46 has its output connected to a second input of the sweep mixer 36 via an on-off selector switch 47 similar to the switch 42. Thereby, the sawtooth waveform supplied by the generator 46 may be selectively supplied to the mixer 36 or, alternatively, that second input of the mixer 36 is returned to ground via switch 47. An on-off power switch (not shown) similar to switch 44 is also provided for the sweep generator 46. The auxiliary sweep generator 46 includes adjustments for the amplitude of the sawtooth waveform as well as for the repetition rate thereof. The sawtooth rate is relatively high and may be adjusted over a range of, say 30 c.p.s. down to 1 or 2 c.p.s. or even one cycle in five or ten seconds; the lower frequencies are generally the more important ones since they permit the accumulation of more detailed information. A suitable circuit for the auxiliary generator 46 is also described in the aforementioned copending application, Serial No. 92,889.

An audio oscillator 48 has its output connected to the third input of the sweep mixer 36 via a selector switch 50 and an on-off switch 52 (similar to the switch 47 for the generator 46) connected in series. The output of the oscillator 48 is also supplied to a pulse former 54, the output of which is supplied to the other fixed contact of the switch 50. Any suitable square wave pulse former may be used; for example, a Schmitt trigger is appropriate. Operation of the switch 50 selects the sine wave output of the oscillator 48 or the square wave output of the pulse former 54. The oscillator 48 has an on-off power switch (not shown) ganged to operate with the on-off selector switch 52, as well as amplitude and frequency adjustments. The frequency of the sine wave oscillations (and thereby, the square wave pulses) may be varied over a range from 24 c.p.s. up to the kilocycle region.

By means of the on-off switches 42, 47, and 52, any one, or all three, of the sources 38, 46, and 48 are selectively connected to the inputs of the sweep mixer 36. The mixer 36 may be a simple resistor mixing circuit, such as is shown in FIG. 2, consisting of individual resistors 88, 90, 92 connecting the switches 42, 47, 52 to a common output 94. The signal at output 94 represents the sum of the input waveforms, and all signals are referenced to ground. The resistors may be assigned the same values or different values where weighting factors are desired. Thereby, different combinations of the sawtooth signals and sine or square wave signals may be derived and applied to the difference amplifier 30 via a cathode follower not shown). The feedback loop for the coil 20 that includes the monitor circuit 28, difference amplifier 30, and power amplifier 32 operates to vary the energization of the coil 20 in accordance with the combined output signal of the mixer 36. An error signal is developed in the difference amplifier 30 in accordance with the difference between the monitored coil current and that called for by the mixer output. The power amplifier drve of the coil 20 is then varied in accordance with the error signal in a direction to reduce the error signal to zero.

In operation, the effect of the combined fields of the coils 20 and 22 produces a spin resonance condition in the atoms, molecules, or molecular fragments of the specimen 24 as the current coil 20 varies through certain values. At the resonant condition, there is a substantial absorption of energy within the specimen 24 which is detected with the marginal oscillator 26 by an appreciable decrease in the amplitude of its output, and by detector circuitry 60–71.

The change in the output of the marginal oscillator 26 is utilized by supplying that output to a preamplifier 60, the output of which is supplied to an amplifier 62, for which gain adjustments are provided. Filters 64 in this detection circuit remove the power supply (60 and 120 c.p.s.) frequencies and pass the modulation frequencies of the oscillator 48 (24 c.p.s. and higher). The filtered signal is supplied to a phase splitter 66 to derive a push-pull signal form which is supplied to a phase sensitive detector 68 which receives a reference signal from a reference amplitude phase circuit 70 synchronized with the audio oscillator 48.

The output of the phase sensitive detector is supplied to a time constant circuit and driver 71, which include a power amplifier driver for a recorder and absorption meter 72. The push-pull outputs of the driver 71 and of the phase splitter 66 are also supplied to the fixed contacts of a double-pole double-throw switch 74, which selects one set of outputs and connects them to an amplifier 76 for driving the vertical deflection plates 78 of an an oscilloscope 80. The horizontal deflection plates 82 of the oscilloscope 80 are driven by an amplifier 84, the input of which is selectively supplied via a switch 86 from the auxiliary sweep generator 46, the audio oscillator 48, or slow sweep generator 38 consistent with the combined scanning signal supplied to the deflection coils 20 and the type of display desired.

In operation, the signal displayed by the oscilloscope 80 is the absorption line or spin resonance characteristic signal derived from the marginal oscillator 26 and passed through the detection circuitry. The displayed signal is selectively tapped from the detection circuitry under the control of the selector switch 74, either before or after passage through the phase-sensitive detector 68 as may be appropriate. Ordinarily, where the sine wave 99 or the pulse train 101 are used to modulate the scanning waveform, the detector 68 is used to derive the absorption signals. The absorption meter and recorder 72 provide output indications and records of the signals developed at the output of the marginal oscillator 26 as the specimen 24 is effectively scanned with a varying magnetic field that is formed as a combined waveform from one or more of the sources 38, 46, and 48.

The theory of spin resonance equipment relies on the magnetic moment of the electrons or atomic nucleus, or other atomic or molecular particles of a specimen. When a unidirectional magnetic field is applied to a particle through the coil 20, the interaction with the particle's magnetic moment results in precession of the particle at a frequency known as the Larmor frequency which is determined in part by the intensity of the magnetic field. That is, the varying field produced by the coil 20 varies the Larmor frequency of precession. The R-F energy in the coil 22, at right angles, produces an R-F field that also interacts with the magnetic moment of the particle. The frequency of the R-F field is included within the Larmor frequency range corresponding to the range of energization of coil 20. When the frequency of precession, the Larmor frequency, is equal to the R-F frequency of the R-F field derived from the oscillator, there is a resonance condition with a transfer of energy from the R-F energy source into the spin system such as the spinning electron. This is detected by the increase of absorption from the R-F oscillator, which, in turn, is manifested by a change in the oscillator current and a corresponding change in the output signal of the oscillator 26. The variation of oscillator output as manifested in the detection circuitry 60–71, represents the spin resonance absorption, and is ultimately displayed on a strip chart recorder 72. The recorder includes a chart moved at a constant rate and a pen that traces out on the chart the amplitude of the derived signal.

If the absorption characteristic of a specimen particle were plotted against frequency, the resulting spin resonance characteristic for line pattern would be of the general shape shown in FIG. 3. At any frequency $f_0$, the corresponding absorption characteristic would be $A_0$. Generally speaking, it is desirable to obtain the overall absorption spectrum or line pattern of a specimen, such as shown by the graph of FIG. 3, though it may also be desirable to be able to measure but a single discrete point of that spectrum, such as the point represented by $f_0$.

In FIG. 4A, a spin resonance characteristic line pattern 100 is shown with absorption plotted against magnetic field intensity B, representing the actual field produced by the current in the winding 20.

In one mode of operation, the switch 47 is "on" to connect the auxiliary sweep generator 46, via the mixer 36, to the difference amplifier 30, and the switches 42 and 52 are connected to the "off" position so that only the auxiliary sweep waveform (based on a D.-C. level from potentiometer 41) is supplied to vary the current in the winding 20. The selector switch 86 is in the position shown in FIG. 1 to supply the auxiliary sweep to the deflection amplifier 84 as the oscilloscope time base. That is, the horizontal deflection signal supplied to the oscilloscope 80 is the same as the scanning waveform supplied to the spin resonance coil 20 for varying the unidirectional field applied to the specimen 24. This auxiliary sweep waveform 97 (FIG. 5B) is adjusted to have an appropriate range to effectively scan a line pattern such as that shown in FIG. 4B once each sawtooth cycle and, thereby, produce oscillator absorption signals that are detected and supplied via switch 74 to the vertical deflection plates 78 of the oscilloscope. That is, as the magnetic field B is varied over the amplitude range of the auxiliary sawtooth, for each value of the associated magnetic field B, there is a corresponding absorption value, and the absorption line pattern 100 is traced out and displayed by the oscilloscope 80.

In another mode of operation the switches 52 and 50 are in the position shown in FIG. 1 so that the audio oscillator 48 is effectively connected through the sweep mixer 36 to the difference amplifier 30, and the switches 42 and 47 are off. Therefore, the sweep generators 38 and 46 are disconnected, and the magnetic field in the coil 20 varies with the sine waveform 99 (FIG. 5C) about the D.-C. level supplied by potentiometer 41. This sine wave is adjusted to be of relatively small amplitude so that it produces a small changing magnetic field, delta B, as shown in FIG. 4A.

As the sine wave produces this small variation in the field B (about a particular value of B corresponding to the D.-C. level), the corresponding absorption value of the line pattern is delta A. The phase-sensitive detector 68 is effective, as described below, to produce the delta A signal; that is, a signal approximately proportional to the difference between the two absorption values corresponding to the peaks of the sine wave. For a small delta B, the ratio of delta A to delta B is approximately the derivative of the absorption curve at the value of B that is applied. For each value of B, the same sine wave is applied, and the corresponding absorption value delta A that is obtained is the corresponding derivative of the line pattern. This delta A value can be displayed on the oscilloscope 80 using the same sine wave as the time base.

One way to obtain the entire derivative curve of the line pattern 100 is with a scanning waveform for the coil 20 that includes the sine wave from the audio oscillator 48 superimposed on the auxiliary sweep waveform (the switch 47 being connected to the "on" position). With the switch 86 connected to the auxiliary sweep generator 46, the derivative of the line pattern 100 would then be displayed on the oscilloscope 80 once for each cycle of the auxiliary sawtooth 97. The derivative curve is of the form 102 shown in FIG. 4B. That is, for each value of the sawtooth over the range of B, the delta B of the sine wave produces a corresponding delta A, so that the derivative curve is traced as the sawtooth 97 passes through the range of B.

The accumulation of signal information corresponding to the operation of the sine wave on the specimen takes place over a specified period of time in accordance with the time constant of the detecting circuitry. For maximum information, this time constant is made as long as possible. Instrumentally, however, the effective limitation is the point where system instabilites and the sum total of noises present, from whatever sources, reach a magnitude comparable with that of the absorption signal. In practice, the time constants may range from the millisecond region to many minutes.

Where the time constant is short, it becomes convenient to scan an entire absorption line, (assuming that such a line is narrow in relation to pertinent instrumental parameters) so that the entire line may be viewed conveniently on a display tube. The scan may be repeated periodically, say, a rate of once every two or three seconds, so that a continuous tracing of a line is presented to the viewer. This is the mode of operation with the combination of the sine waveform and the auxiliary sawtooth waveform being combined to modulate the magnetic field of coil 20. Additional modes of operation are obtained with the apparatus of FIG. 1. Reference is made to FIG. 6 for this purpose.

For example, one combined waveform for modulation of the currents in coil 20 is a combination of the slow sawtooth 95 and auxiliary sawtooth 97 with the audio oscillator 48 disconnected, and the slow sweep generator 38 and auxiliary sweep generator 46 supplying their waveforms to the sweep mixer to drive the coil 20. The switch 86 is connected to the output of the auxiliary sweep 46 so as to use the latter for the time base of the display oscilloscope. The switch 74 is connected as shown in FIG. 1 to derive the signal from the phase splitter 66 directly (the phase sensitive detector 68 is bypassed when the sine wave 99 or pulse train 101 are not used to modulate the scanning waveform).

At some value of the slow sawtooth current, that indicated by the arrow $I_a$ in FIG. 6 occurring at the time $t$, the auxiliary generator 46 superimposes its repetitive sawtooth signal 97. The auxiliary sawtooth and slow sawtooth combined vary between the values $I_b$ and $I_c$ around the central value $I_a$ of the slow sawtooth 95. Within that range of repetitive current values, a characteristic absorption line 104 (FIG. 6) is developed and displayed on the oscilloscope. As the value of the current derived from the slow sawtooth 95 changes, say to $I_d$, the auxiliary sawtooth is combined to produce a variation in coil current from $I_e$ to $I_f$. The absorption line 104 is no longer present in this portion of the spectrum; however, another line 106 is present. Thus, as the slow sawtooth 95 continues to develop from $I_a$, the line 104 is gradually moved across the field of view of the oscilloscope 80 and disappears. As the combined current value of $I_e$ develops, line 106 starts to appear and slowly moves across the oscilloscope face. Successively, neighboring absorption lines come into view, and the entire absorption spectrum may be scanned.

In a similar fashion, when the sine wave 99 is combined with the auxiliary and slow sawtooths, successive derivative line patterns 108 and 110 are derived and displayed on the oscilloscope. The operation is similar to that described above for the auxiliary sawtooth and sine wave combined; the slow sawtooth provides an additional variation in the base level on which the other waveforms are added so that an entire spectrum is scanned. In such a spectrum display, either the direct absorption lines 104 and 106 or their derivatives 108 and 110 are successively presented to the field of view of the observer.

For recording on the strip chart of the recorder 72, the sine wave 99 is combined with the slow sawtooth 95 (the auxiliary sawtooth is not needed). In addition, the absorption signals may be simultaneously displayed on the oscilloscope for observation by the operator.

To summarize the different modes of operation available with combinations of the audio oscillator 48, the sweep generator 38 and auxiliary sweep 46, there are at least five different modes available. With only the audio oscillator 48 supplying a modulation signal to the sweep mixer, the setting of the potentiometer 41 provides a D.C. level for that sine wave. With this arrangement, spot check measurements may be made of the derivative form of a line pattern. The auxiliary sawtooth and the sine wave modulation is useful to obtain the derivative of an entire absorption line as a stationary display on the oscilloscope 80; a desired portion of the spectrum is selected by the D.C. setting of potentiometer 41. The slow sawtooth and sine wave combined supply a modulation of the coil 20 that is suitable for slowly scanning the entire spectrum of a specimen to derive the derivative of the line pattern in a manner suitable for recording on the strip chart 72. When all three modulation sources 38, 46, and 48 are on, the combined waveform, as described above in connection with FIG. 6, is a derivative of the line pattern which is suitable for display on the oscilloscope 80 to provide a continuously changing display of an assembly of lines of the spin resonance spectrum. With just the slow generator 38 and auxiliary sweep 46, a direct absorption line pattern continuously changing over a spectrum is provided which would be suitable for viewing on the oscilloscope 80.

The operation of this system of FIG. 1 is now described with the switch 50 in the opposite position to connect the pulse former 54 into the sweep mixer 36. Assuming the auxiliary sweep 46 and the slow sweep generator 38 are "off," and the potentiometer 41 supplies an appropriate D.C. current value $I_0$ (as illustrated in FIG. 7), the square wave pulses 101 produce a resulting current value $I_a$. The latter current, in turn, produces a corresponding magnetic field B in the coil 20 to establish an absorption value $A_a$, detected in the circuitry 60–71. The current excursion represented by pulse 101 between the values $I_0$ and $I_a$ is a discontinuous one because of the essentially instantaneous rise and fall times of that pulse 101 compared to the width of the pulse 101 (for example about 1–2% or even more); the values of extreme excursions have an amplitude variation that is very small compared to the total excursion (for example, ½% or even more is useful).

The initial value $I_0$ is well removed from the region of absorption of the line pattern 112, and the value $I_a$ extends into that absorption curve 112. The signal representing the absorption value $A_a$ actually represents the magnitude of the absorption occurring with the magnetic field B corresponding to $I_a$. This direct absorption curve 112 is in contrast to the derivative absorption curve 102 produced by the sine modulation 99 where the peak-to-peak current excursion is ordinarily only a small fraction of the line. With a change in the D.C. setting provided by the potentiometer 41 to a value $I_0$, the excursion of the pulses 101 is to a value $I_c$ producing an absorption value of $A_c$. And so on, with successive values of $I_0$ set by the potentiometer, the tops of the pulses 101 pass through the entire range of values necessary to trace out the line 112. The amplitudes of the pulses 101 are chosen to be greater than the corresponding width of the line 112; that is, $I_0$ is outside of the line 112 for all values of $I_a$, $I_c$ that trace out the line 112. Thus $A_0$, corresponding to $I_0$ is a reference level for all of the other absorption values derived.

With the slow sweep generator 38 connected into the swep mixer, the D.C. value of the current on which the pulses 101 are based continuously increases so that the resultant value of current discontinuously assumes values that sweep over the entire pattern 112. Thereby, the entire line pattern may be derived in a slow manner suitable for strip chart recording, and continuation of the slow scan may be suitable for deriving an entire line spectrum of a plurality of absorption lines.

When the square wave pulses 101 are superimposed on the auxiliary sawtooth 46 alone, together with an appropriate D.-C. setting provided by the potentiometer 41, a direct absorption line suitable for viewing on the oscilloscope 80 is provided in a manner similar to that described above. Where all three sources 38, 46, and 54 are combined to provide the modulation of the coil 20, the resulting superimposed scanning causes a complete line pattern to move across the display tube 80. Thereby, the entire absorption spectrum may be viewed, with the portion displayed on the oscilloscope at any instant (due to the auxiliary sawtooth) being sufficiently wide to see complete lines at a glance.

In practice, only one of the current values of the square wave pulses 101, whether it be the higher or lower of these discontinuously obtained current values, need be completely outside of the absorption curve in order for a true absorption signal to be obtained. The operator accordingly can adjust the amplitude of the pulses from the pulse former 54 to insure the correct relationship of the amplitude of those pulses 101 and the width of the particular line pattern under test. As a typical set of parameters, the current excursion of the pulse 101 may be appropriately of the order of three times the adsorption line width. As the line is approached from the low current side, the high current portion of the square wave pulses 101 first encounters the line pattern 112 to furnish a complete absorption signal for the line in its entirety. The line pattern 112 then disappears for a short time until the lower current portion of the square wave signal reaches the line (as the slow sawtooth continues to increase), and the higher current value is outside of the line 112 and furnishes a reference absorption value. The absorption line 112 is traced out a second time; however, this time the line absorption signals are in opposite polarity (due to the operation of the phase-sensitive detector 68) so that on the display oscilloscope (FIG. 8) a negative-going line pattern 114 is presented which is readily identified and distinguished from the positive-going line pattern 112. The use of a 50% duty cycle for the pulses 101 permits both the tops and bottoms of the pulses to be used in this manner. When the pulse former 54 is operated with the slow sweep generator 38, the scan reversal control 44 determines from which direction the absorption line 112 is approached. Thus, it may be approached from either direction (left or right), or both scans may be sequentially performed and the results compared for any differences that may exist which would suggest certain hysteresis effects.

In FIG. 9 a suitable example of circuitry is illustrated for the detection circuitry 60–71 of FIG. 1. The marginal oscillator 26 has a tuned grid-cathode circuit that includes the R.-F. specimen coil 22. When the spin resonance condition occurs, the Q of the oscillator goes down to change the plate current thereof, with a corresponding effect on the plate voltage; the latter is the absorption signal supplied to the preamplifier 60. The preamplifier 60 includes a pair of triodes 122 having a common cathode resistor and in which the input triode is connected as a cathode follower and the output triode, as a cathode-fed amplifier. The preamplifier 60 feeds another amplifier 62 that includes three twin triodes 124, 126, and 128. The first triode pair 124 includes two cathode follower connections with filter coupling networks 130 therebetween. The cathode impedance of the second cathode follower circuit includes a gain adjustment selector switch 132 which feeds one input of the triode pair 126, which is connected as a difference amplifier. The other input of the difference amplifier 126 receives its signal through suitable filter networks 134 from the cathode of the input cathode follower stage 128. The cathode follower 128 is fed from the difference amplifier 126, and the filter network 134 completes a feedback loop.

The filter 130 is designed to filter out the power frequencies such as the 60 cycle and 120 cycle, and to pass the other frequencies which control the derivation of the absorption signal. The filter 134 in the feedback path of the amplifier 126 does not transmit the 24 c.p.s. modulation frequency so that the loop is open for signals at that frequency whereby those signals receive normal gain while signals at other frequencies are attenuated by the feedback circuit.

The resistor of cathode follower 128 is selectively tapped by switch 136 (ganged to switch 132) for gain adjustment to feed the amplifier stage 129. The amplifier 129 has its output connected to the cathode follower input of the phase splitter 66, the output of which has its anode and cathode connected in push-pull relationship to the cathode followers 140 and, thereby, to the cathodes of a twin diode 142, connected as a phase-sensitive detector 68. The anodes of the diodes 142 receive the reference signal derived from the audio oscillator 48 (FIG. 1) via an amplitude and phase setting circuit 70 which determines the level of the reference signal applied to the phase-sensitive detector 68.

The amplitude of the reference signal supplied by the circuit 70 is larger than the largest amplitude absorption signal that is developed and supplied to the phase-sensitive detector 68. The reference signal is related in phase to the phase of the energizations of the coil 20 and to the phase of the absorption signal developed in the marginal oscillator 26. If the reference signal is grounded (as during test), there is equal clamping action to ground of the negative-phase absorption signal on the part of both detector diodes 142 during successive half cycles of the 24 c.p.s. modulation signal 99 or 101. The resistor-capacitor networks 153 at the grids of those cathode followers 152, 154 filter out the 24 c.p.s. modulation signal component in the absorption signal so that the resulting effective signal is a direct voltage that varies with variations in the absorption signal. Thus, with a ground reference signal, essentially the same voltage is developed at the cathodes of the cathode followers 152 and 154.

When the 24 c.p.s. reference signal is applied to the detector 68, this reference signal is in phase with the absorption signal supplied to one of the diodes and 180° out of phase with the other. If the reference signal and absorption signal agree in phase and change in the same direction, there is relatively little clamping action of the detector, while if they disagree, the clamping action is much greater, which (for the circuit shown) results in a more positive direct voltage insertion (the clamping, level-setting action in each case takes place during part of the positive half-cycle of the reference). The waveshape of the in-phase channel effectively varies negatively with respect to the clamping level and the out-of-phase waveshape varies positively by essentially the same amount. Thus, the difference between the average clamped signal values (the detector output) is proportional to the absorption signal itself. The polarity of the detector output is positive or negative depending upon which of the two detector channels is in phase with the reference.

Consequently, during the scanning of one side of the line pattern (see FIG. 4) with the 24 c.p.s. sine wave supplied to the field coil 20, the absorption signal level during the first half-cycle of the sine wave may be less than the second half-cycle. Under those circumstances, the detector 68 discriminates (effectively taking the difference between the signal levels) to provide a derivative line pattern 102 that is positive as shown in FIG. 4B. During scanning of the right hand half of the line pattern 100 with the sine wave, the absorption relationship is the reverse; i.e. more absorption during the first half-cycle and less during the second half-cycle, and this is discriminated in the detector 68 with a resulting negative-going waveform of the right hand half of FIG. 4B.

Analogously, the phase-sensitive detector 68 discriminates in favor of the first half-cycle of the square wave pulses, say, when the current I is increasing to approach the line pattern 112 from the left, and to discriminate in favor of the second half-cycle when the current is increasing going away from the line pattern towards the left. In the former case, the larger values of current are used to detect the absorption value (the lower values essentially providing a reference level), and in the latter case, the lower values of current detect the absorption value (the higher values providing the reference absorption value). These two distinct conditions are thereby distinguished appropriately and manifested by the two different line patterns 112 and 114 derived in the two different cases. Accordingly, the detector 68 functions effectively to gate the appropriate values of the opposite-phase absorption signals.

Time constant selection circuits are connected to the cathodes of the detector diodes 142, each in the form of a plurality of capacitors 144 and 146 respectively shunted to ground via selector switches 148 and 150 which are ganged. The time constant capacitors 144 and 146 are for the purpose of averaging out noise, i.e. to filter out everything but the modulation frequency, namely, the 24 c.p.s. which is the frequency of the reference signal for the phase-sensitive detector 68. The different capacitor values which may be selected permit adjustment for different noise or recording speed conditions. The lower the speed, the greater is the time constant.

The adjustable cathode resistor 156 of the output cathode followers 152 and 154 may be adjusted for recorder balance. A cathode resistor 158 is also adjustable for setting of the zero scale position of the recorder. Output connections 160 and 162 of these cathode followers provide push-pull inputs to the vertical deflection amplifier 76 (FIG. 1). A micro-ammeter 164 connected between the outputs 160 and 162 is calibrated as an absorption meter to provide readings on a spot check basis. A resistor network 166 connected between the outputs 160 and 162 is tapped to provide outputs to the strip chart recorder in push-pull relationship.

The display oscillograph time base is chosen to be the auxiliary sweep sawtooth for normal display of a full line pattern. The slow sawtooth is used as a time base to provide a display of the line pattern being developed under conditions corresponding to strip chart recording. This slow line pattern display may be together with or instead of the strip chart recording. The audio oscillator sine wave is used as the oscilloscope time base for spot checking of the absorption spectrum when searching for absorption lines as a preliminary to going into other scanning procedures.

The rectangular wave output of pulse former 54 is useful in obtaining the derivative line pattern as well as the direct absorption line pattern; the operation is generally similar to that described above for the sine wave. The amplitude of the pulses is adjusted to be a relatively low value, corresponding to only a small part of the width of an absorption line (for example, a suitable value of the pulse height or excursion would be that corresponding to about 10% of the line pattern width at the half-amplitude points thereof; the sine wave amplitude is the same, and a 50% duty cycle is used). Actually, the rectangular wave tends to give a more accurate derivative measurement than the sine wave. That is, the ratio of a difference in two precise values of absorption and current more closely approaches a true derivative than the corresponding measurements made with the sine wave. However, the sine wave is useful for obtaining the derivative of a line pattern even though the information signals tend to be useful only in a qualitative sense. The reason for this is that it may be easier to generate a sine wave than a square wave, and the detection circuits may be used with a sine wave at a higher frequency than corresponding square waves.

The above described system and apparatus is intended to enable the viewing of an entire absorption line by an observer. This involves the presentation more or less simultaneously of the entire region of absorption represented by the line as well as the configuration of the line itself. The configuration concept of the line implies the determination by the equipment of the absorption amplitudes corresponding to the characteristics of the specimen under examination so that each point in the line, does, in effect, represent such a specific absorption characteristic.

The nature of spin resonance is such that in a great majority of cases, the absorption encountered is relatively small. In the great majority of cases, such absorptions are not measureable except by equipment specifically designed to accomplish such results. It is normally desirable to use techniques such as tuned filters, high gain amplifiers, phase detectors, and long time constants in order to achieve useful results. It is evident, therefore, that limitations are thereby placed upon the rapidity with which different portions of an absorption characteristic can be sampled. For example, for maximum determination of absorption at a particular point in an absorption line, noise corresponding to factors such as microphonics, disturbing fields, noises of electronic origin such as flicker and shot effect as well as, perhaps, Johnson noise must be averaged out. Such averaging for maximum effectiveness is normally in the region of many seconds or perhaps minutes. For maximum quantitative results, traces of a single line are obtained on a strip chart with a typical run taking perhaps a good fraction of an hour for completion.

Highly useful results, however, can be obtained with somewhat shorter time constants, perhaps, in the sub-second or millisecond region. It is important to note that these time constants apply to specific points on an absorption characteristic so that a large number of such time constants must be placed end to end in order to accomplish the objective of tracing out an entire absorption characteristic or line.

The tracing out of an absorption characteristic, therefore, necessarily requires at least a number of seconds in order to allow reasonable time for the acquisition or accumulation of information for each point concurrently with the averaging out of noise of the aforementioned type of noise necessarily present in such a system. It should be emphasized that it is not merely sufficient to accumulate information, but of equal importance to average out unwanted information that is classified as noise. A rapid tracing of an entire absorption curve with essentially no consideration given to the above mentioned averaging out requirements results in poor quality measurements. In quickly tracing out a complete line, for example, with a 60 cycle line scan in which a half cycle is $\frac{1}{120}$ of a second, a large portion of the time is spent either before or after the line pattern traced, and such a fast cycle leaves only a very small element of time available for each portion of the curve. For example, suppose that half the effective time, $\frac{1}{240}$ of a second, is available for tracing this line and that the line itself consists of 100 parts. This means now that $\frac{1}{240}$ of a second, or essentially four milliseconds is available for 100 points of information delineating such a line. Per line element or point, therefore, only 40 microseconds are left. This period of time is far less than is required to average out slowly moving noise phenomena such as flicker effect and most types of microphonics. In effect, only a crude kind of signal is obtainable under these conditions, and the measurements are of correspondingly poor quality.

It is possible and practicable to separate out the two requirements of presenting the complete absorption line as well as obtaining adequate information for each of its individual points in the same operation. This is done by choosing with a great deal of freedom the best frequency rate in each case. The method of operation is to develop a modulation signal representing a composite of the two frequencies involved and in separating out the information obtained from each of these signals in a separate way and combining them finally at the presentation of greatest convenience to the viewer. For example, the modulation of the actual absorption may be chosen arbitrarily at the rate which is furthest removed from the frequencies associated with the bulk of the noise present, such as shot effect and microphonics. In cases where such frequencies contribute substantially to overall system noise, it is sometimes found that their frequency spectrum becomes negligible above this range of 200–300 c.p.s. and a modulation frequency may then be established above this limit. Other modulation frequencies may be chosen in other instances. The final output corresponding to the absorption amplitude for any particular part of the absorption curve is obtained by averaging the absorption information for a specified period of time for each part of the curve. In this way the noise is averaged out to a very large degree. If now the entire line is scanned within a period of, say, three seconds, and if the line again consists of 100 discrete points, we now have .03 of a second per line element, or 30 milliseconds. This value of 30 milliseconds may then be compared with the figure of 40 microseconds per line element previously indicated for a 60 cycle line scan. This factor of essentially 1000 in averaging time can substantially make the difference between a curve of very poor quality and a curve indicated with a considerable degree of accuracy in the actual absorption characteristic.

It is important to distinguish between the process of visual observation of the curve and the final recording by means of pen and ink on a strip chart of the absorption characteristic. In the latter case, where there is normally no requirement for concurrent visual observation, a single tracing of the curve may be carried out over a period of an hour or more. Here the time constant per line element may be of the order of several seconds or perhaps longer. Since a substantial investment of time is involved in this final recording, it is important to insure that all operating parameters are optimized. Such optimizing is conveniently carried out during the foregoing visual observation stage when the entire line is being scanned by the auxiliary sawtooth at this rate of one scan per 2–3 seconds. Under these conditions, it is convenient to determine the exact type of amplitude and modulation desired, make certain final adjustments on time constant and phase of the detecting circuitry, and perhaps make test runs on hysteresis effects such as might be indicated by differences in line configuration depending upon the direction of scan (as defined by the sawtooth varying from high magnetic field to low field, or vice versa).

What is claimed is:

1. A spin resonance system for testing the characteristics of specimens comprising means for applying a combined magnetic field to a specimen along one axis thereof including means for selectively supplying a first energization continuously varying over a substantial time period, means for selectively supplying a second varying periodic energization with a plurality of cycles over said time period at a first cycle frequency, means for selectively supplying another periodic energization at a higher cycle frequency including means for varying the amplitude of the energization, the selective operation of each of said selective supplying means being independent of the others thereof, and means for combining all of said energizations that are selectively supplied including energizations from all of said supplying means and applying the combined energization to a specimen along the one axis thereof; and means for detecting the response characteristic of the specimen to said combined energization including means for applying a radio frequency magnetic field to said specimen along a transverse axis.

2. A spin resonance system as recited in claim 1 and further comprising a cathode ray tube display system having a time base operation, and means for selectively supplying a time base signal to said display system in synchronism with any one of said energizations.

3. A spin resonance system as recited in claim 2 and further comprising a recorder for the detected response characteristic operable on a time basis synchronously related to said slowly first varying energization.

4. A system for spin resonance detection comprising means including a coil for applying a plurality of transverse magnetic fields to a specimen, and means for energizing said coil with a signal having a plurality of components, said energizing means including a slow sweep generator for supplying a slowly varying energization and including means for varying the range of said energization and the rate of change thereof, an auxiliary sweep generator for supplying a fast varying periodic energization at a low frequency and including means for varying the range of the periodic energization and frequency thereof, means for supplying a periodic energization at high frequencies and including means for varying the amplitude and frequency thereof, means for combining said energizations and for supplying the combined energization to said coil, means including switches for selectively connecting each of said energization supplying means to said combining means and alternatively a constant energization level, said selective connecting means including means for adjusting the constant energization level associated with one of said supplying means, and means for detecting the spin resonance response characteristic of the specimen to the combined energization.

5. A system as recited in claim 4 wherein said detecting means includes filter circuit means for eliminating signals of frequencies other than those of said coil energizations, a phase-sensitive detector circuit operable in synchronism with said high frequency energization, means for filtering out signal components at said high frequency from the detected signal, and means for balancing the filtered signal and for setting a reference level therefor.

6. A system as recited in claim 4 wherein said detecting means includes a display oscilloscope, and means for selectively setting the time base thereof in synchronism with any one of said energization supplying means.

7. A system for spin resonance detection comprising means for applying a magnetic field to a specimen along one axis, coil means for applying a combined magnetic field to said specimen along a transverse axis including a slow sawtooth sweep generator for supplying a slowly varying energization, an auxiliary sawtooth sweep generator for supplying a relatively fast varying periodic energization at a first frequency and having means for varying the range of the periodic energization and frequency thereof, means for supplying a periodic energization at higher frequencies and including means for varying the amplitude and frequency thereof, and means including switches for selectively connecting each of said energization supplying means to said coil means, individually and in combinations of two and all three thereof, and means connected to said first-mentioned means for detecting the spin resonance characteristic of a specimen to the combined energization.

8. A system as recited in claim 7 wherein said detecting means includes a display device, and means for selectively setting the time base thereof to be synchronous with different ones of said energization means and generators.

9. A system as recited in claim 8 wherein said slow sweep generator includes means for varying the rate of change thereof over a range of minutes, said means for varying the frequency of said auxiliary sweep generator is effective to vary the period thereof from seconds to fractions of a second, and said means for varying the frequency of said high frequency means is effective to vary the frequency thereof over the audio frequency range.

10. A system for spin resonance detection comprising means for applying a magnetic field to a specimen along one axis, coil means for applying a combined magnetic field to said specimen along a transvere axis including a slow sawtooth sweep generator for supplying a slowly varying energization over a substantial time period, an auxiliary sawtooth sweep generator for supplying a fast varying periodic energization at a low frequency and having means for varying the range of the periodic energization and frequency thereof, and means including switches for selectively connecting each of said energization supplying means to said coil means, individually and in combination, means connected to said first-mentioned means for detecting the spin resonance characteristic of a specimen to the combined energization, and a cathode ray tube display means including time base means selectively operable in accordance with one and the other of said energizations.

11. A system as recited in claim 10 wherein said coil means includes a coil and said connecting means includes means for combining said sawtooth energizations and for supplying the combined energization to said coil.

12. A spin resonance system for testing the characteristics of specimens comprising means for applying a combined magnetic field to a specimen along one axis thereof including coil means and means for selectively supplying different combinations of energization to said coil means including all combinations of a first energization continuously varying over a certain time period, a second varying periodic energization with a plurality of cycles over said time period at a first cycle frequency, and another periodic energization at a higher cycle frequency, means for detecting the response characteristic of the specimen to said combined energization including means for applying a radio frequency magnetic field to said specimen along a transverse axis, and means for displaying the response characteristic in accord with a time base selectively synchronous with any of said energizations.

References Cited in the file of this patent

UNITED STATES PATENTS

| | | |
|---|---|---|
| 2,859,403 | Kirchner | Nov. 4, 1958 |
| 2,996,658 | Kirchner et al. | Aug. 15, 1961 |

OTHER REFERENCES

Gutowsky et al.: The Review of Scientific Instruments, vol. 24, No. 6, August 1953, pages 644 to 652 incl.

Smaller et al.: The Review of Scientifiec Instruments, vol. 24, No. 10, October 1953, pages 991 and 992.

Wertz: Chemical Reviews, vol. 55, No. 5, October 1955, pages 837, 838, 888–896 principally relied upon.

Mitchell et al.: British Journal of Applied Physics, vol. 7, No. 2, February 1956, pages 67 to 72 inclusive.

Rollwitz: Proceedings of the National Electronics Conference, vol. XII, Apr. 15, 1957, pages 113–125 incl.